United States Patent
Spencer

(10) Patent No.: US 12,509,757 B2
(45) Date of Patent: Dec. 30, 2025

(54) KITCHEN APPLIANCE, DECORATIVE ARTICLE THEREFOR, AND METHOD OF MANUFACTURING A DECORATIVE SURFACE

(71) Applicant: KENWOOD LIMITED, Havant (GB)

(72) Inventor: Rob Spencer, Havant (GB)

(73) Assignee: KENWOOD LIMITED, Havant (GB)

( * ) Notice: Subject to any disclaimer, the term of this patent is extended or adjusted under 35 U.S.C. 154(b) by 132 days.

(21) Appl. No.: 17/617,482

(22) PCT Filed: Jun. 10, 2020

(86) PCT No.: PCT/GB2020/051402
§ 371 (c)(1),
(2) Date: Dec. 8, 2021

(87) PCT Pub. No.: WO2020/249947
PCT Pub. Date: Dec. 17, 2020

(65) Prior Publication Data
US 2022/0235449 A1   Jul. 28, 2022

(30) Foreign Application Priority Data

Jun. 10, 2019  (GB) .................... 1908262
Jun. 17, 2019  (LU) .................... 101270

(51) Int. Cl.
*C23C 14/04* (2006.01)
*B29C 45/00* (2006.01)
(Continued)

(52) U.S. Cl.
CPC .......... *C23C 14/04* (2013.01); *B29C 45/0001* (2013.01); *C23C 14/0021* (2013.01);
(Continued)

(58) Field of Classification Search
None
See application file for complete search history.

(56) References Cited

U.S. PATENT DOCUMENTS 4,517,730 A  *  5/1985  Meignant ............ H01L 21/0272
                                                        257/E21.231
2010/0167003 A1 *  7/2010  Vahle ....................... B32B 3/02
                                                              428/101

(Continued)

FOREIGN PATENT DOCUMENTS

CN   109609908 A    4/2019
CN   112823096 A    5/2021
(Continued)

OTHER PUBLICATIONS

Office Action issued in corresponding United Kingdom Application No. GB1908262.7 dated Oct. 24, 2022 (4 Pages).
(Continued)

*Primary Examiner* — Shamim Ahmed
*Assistant Examiner* — Bradford M Gates
(74) *Attorney, Agent, or Firm* — Harness, Dickey & Pierce, P.L.C.

(57) ABSTRACT

There is provided a method of manufacturing a decorative surface, comprising the steps of: coating a substrate with an opaque coating using a vapour deposition process; and etching the coating to expose the substrate selectively thereby to manufacture a decorative surface.

13 Claims, 4 Drawing Sheets

(51) Int. Cl.
  *C23C 14/00* (2006.01)
  *C23C 14/20* (2006.01)
  *C23C 14/24* (2006.01)
  *C23C 14/34* (2006.01)
  *C23C 14/58* (2006.01)
  *B29K 69/00* (2006.01)

(52) U.S. Cl.
  CPC .............. *C23C 14/20* (2013.01); *C23C 14/24* (2013.01); *C23C 14/34* (2013.01); *C23C 14/5813* (2013.01); *C23C 14/5873* (2013.01); *B29K 2069/00* (2013.01); *B29K 2995/0007* (2013.01)

(56) References Cited

U.S. PATENT DOCUMENTS

| | | | | |
|---|---|---|---|---|
| 2010/0315826 | A1* | 12/2010 | Anderson | G02B 6/001 427/163.1 |
| 2012/0097194 | A1* | 4/2012 | McDaniel | A01N 63/50 435/197 |
| 2015/0022994 | A1* | 1/2015 | Bingle | G01D 13/20 362/23.01 |
| 2016/0318222 | A1 | 11/2016 | Deckert et al. | |
| 2017/0146730 | A1* | 5/2017 | O'Keeffe | G02B 6/0038 |
| 2019/0375139 | A1 | 12/2019 | Deckert et al. | |
| 2021/0387570 | A1* | 12/2021 | Piles Guillem | B44C 5/04 |

FOREIGN PATENT DOCUMENTS

| | | |
|---|---|---|
| EP | 2374592 A2 | 10/2011 |
| EP | 2409832 A1 | 1/2012 |
| EP | 3083183 A1 | 10/2016 |
| JP | S5754268 A | 3/1982 |
| JP | 2011140126 A | 7/2011 |
| WO | WO-2011023798 A1 | 3/2011 |
| WO | 2020-084571 A1 | 4/2020 |

OTHER PUBLICATIONS

International Search Report and Written Opinion of the ISA issued in PCT/GB2020/051402, mailed Oct. 7, 2020; ISA/EP.

GB Search Report of the Intellectual Property Office issued in Application No. GB1908262.7, dated Nov. 27, 2019.

LU Search Report and Written Opinion of the Intellectual Property Office issued in Application No. LU101270, mailed Mar. 31, 2020.

Notification of the Second Office Action for corresponding Chinese Patent Application No. 202080041880.0 dated Apr. 12, 2024, with English translation (20 Pages).

* cited by examiner

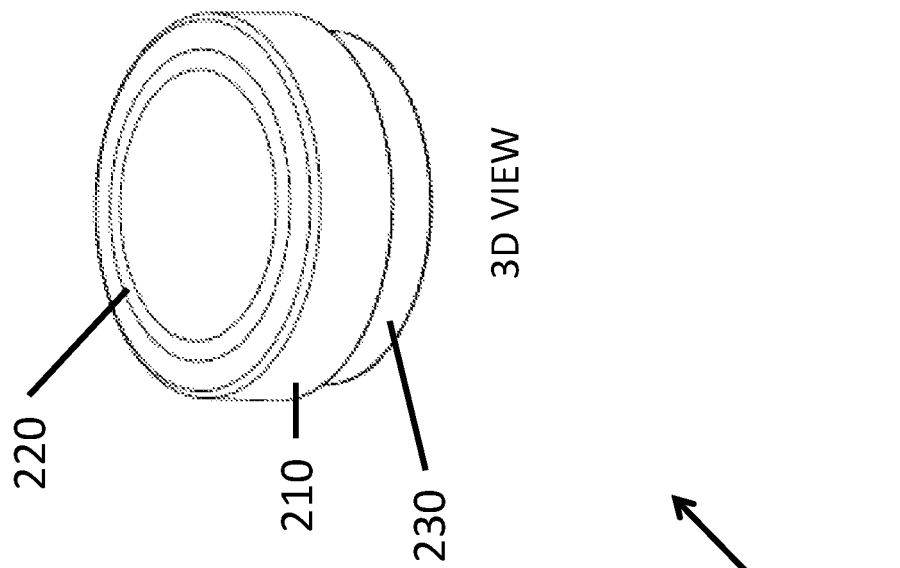
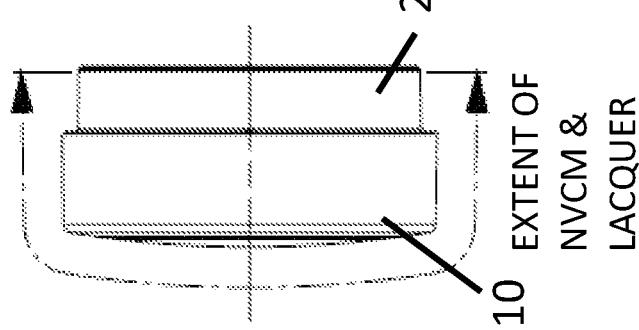
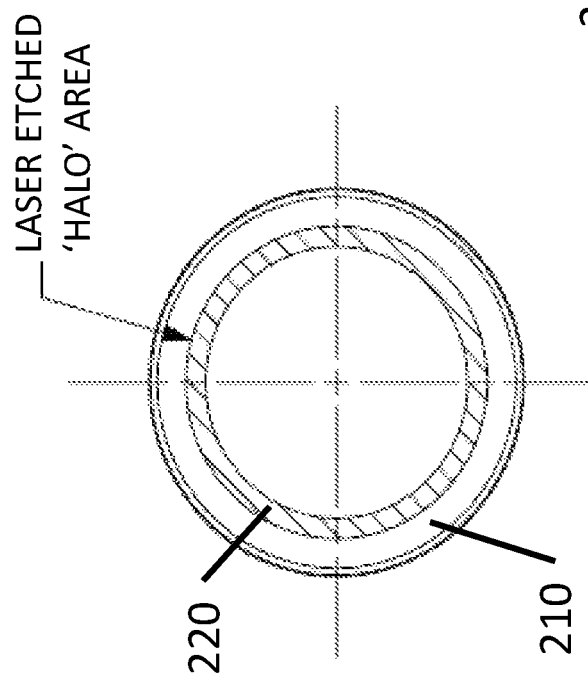

KITCHEN APPLIANCE, DECORATIVE ARTICLE THEREFOR, AND METHOD OF MANUFACTURING A DECORATIVE SURFACE

CROSS-REFERENCE TO RELATED APPLICATIONS

This application is a U.S. National Phase under 35 U.S.C. 371 of International Application No. PCT/GB2020/051402, filed Jun. 10, 2020, which claims the benefit of Great Britain Application No. 1908262.7, filed Jun. 10, 2019 and Luxembourg Application No. LU101270, filed Jun. 17, 2019. The entire disclosure of each of the above-identified applications is incorporated herein by reference.

The present invention relates to, a decorative article (in particular, a knob or dial for a kitchen appliance), a kitchen appliance including the decorative article, and a method of manufacturing a decorative surface.

Typical kitchen appliance control knobs (also referred to as control dials), for example control knobs used on stand mixers such as the Kenwood Cooking Chef™, are backlit to provide the user with an indication of the appliance's status. For example, the backlit knob can indicate the motor state as being either on or off (in which case the light may have a steady state illumination which may be either on or off), or an error condition such as an open interlock (in which case the light may be flashing). This backlighting may be achieved by providing a transparent part on a knob which a light built into the kitchen appliance may shine through.

Consumers typically associate a shiny, mirror-like finish on a kitchen appliance with cleanliness/ease of cleaning, as such finishes make it easy to see when there is dirt on the surface having the finish. Providing such a finish on a control knob is therefore desirable. It is therefore further desirable that those areas of the knob (and indeed potentially any other area of the appliance) which are not left transparent in order to have light emitted through them, have such a finish. As the knob is the most handled part of an appliance, it is also the part that is most likely to be exposed to scratching and wear; therefore this shiny finish is preferably achieved through using a wear-resistant metallic finish such as chromium.

An example of how this kind of illuminated knob is presently achieved is shown in FIG. 1. This illumination is currently presented as a uniform circular band or 'halo' on the front face of the control knob. Five parts are used to form the knob: an outer knob ring 1, central light guide 3 for guiding light from the light source towards the point from which it is to be emitted, button 2 on which the user presses to depress the knob, adhesive 5 for retaining the button 2, and seal 4 for preventing material ingressing between the components. To achieve the illumination, the light guide part 3 is translucent to allow light from the LEDs on the control knob PCB (not shown) to pass through. The outer knob 1 and button 2 are both opaque and are chrome plated on the outer surface to provide a shiny finish.

The five-piece design has the following shortcomings:
Potential water ingress around the halo: this necessitates the use of a separate seal 4.
Aesthetics and feel: the transition between the parts can be seen and felt by the user and is unsightly.
Part and assembly cost: the design uses five separate parts, which need to be assembled in a multi-stage assembly process.
This multi-stage, multi-part knob assembly was used as a result of the difficulty of creating a single-piece knob.

It is therefore desirable to provide a knob, and a method of manufacturing the same, capable of at least partially ameliorating the above-described issues.

SUMMARY OF THE INVENTION

Aspects and embodiments of the present invention are set out in the appended claims. These and other aspects and embodiments of the invention are also described herein.

In an aspect, there is provided a method of manufacturing a decorative surface, comprising the steps of coating a substrate with an opaque coating preferably using a vapour deposition process; and preferably etching the coating (preferably all the way through the coating) to expose the substrate selectively thereby to manufacture a decorative surface (preferably having a decorative pattern). The substrate may be transparent. The coating is preferably more opaque (or less transparent) than the substrate.

The use of a vapour deposition process may allow for a thinner coating layer to be produced, which may thereby improve ease of etching.

The decorative surface may comprise a pattern formed by the etching of the coating that allows light to be transmitted therethrough. As the etching removes the opaque coating the substrate is exposed thereby to form the pattern.

The opaque coating may be metallic, preferably aluminium. The coating may also preferably be elemental, which may enhance chemical stability. The coating preferably has a thickness of less than 0.5 µm, and more preferably has a thickness between 0.3 and 0.5 µm, which may facilitate ease of etching. The coating is preferably reflective, having a reflectance of at least 80% and more preferably 90% for light in the wavelength range 300-700 nm. Yet more preferably the coating has a mirror-like finish, which may provide for improved ease of cleaning. The coating also may have at least one of the following properties, which may facilitate ease of etching: a Vickers hardness of 600 MPa or less, preferably between 160 and 350 MPa; and a density of 2.7 g/cm$^3$ or less.

The etching step may be performed using a laser. Preferably the laser has a power output at peak of at least 50 watts, and more preferably at least 75 watts, so that the laser may be capable of efficiently etching the coating. The laser may preferably be capable of emitting light at a wavelength for which the substrate is substantially transparent, which may minimise the damage to the substrate during the etching step. Preferably the wavelength at which the laser emits is 10 µm or lower, more preferably the wavelength is approximately 1.06 µm, which may be particularly suitable for etching metals. The laser may be a $CO_2$ laser.

The vapour deposition process may be a physical vapour deposition process, such as sputtering or evaporation. This may avoid the need for chemical reactions at the surface of the substrate, and may enable an elemental coating to be used. This also may lower the substrate temperature required compared to chemical vapour deposition processes.

The decorative surface may preferably consist of food safe materials, as the surface is intended for kitchen appliances. For example, the materials may preferably be physically and chemically stable between temperatures of 0 and 100 degrees Celsius.

The method may also include the additional steps of providing a lacquer to the coating prior to etching and/or applying a protective coating to the surface following etching, the protective coating preferably being UV-resistant. This protective coating may smooth the transition between the coated and the etched areas, may protect the substrate and coating from being degraded by UV light, and also may form a final protective layer against wear and tear of the surface.

Prior to application of the opaque coating, the substrate may be cleaned, preferably ultrasonically, and a base coating may optionally be applied to the substrate in order to enhance the adhesion of further coatings. The base coating may then be cleaned again, preferably electrostatically, before the coating step is performed to remove impurities. Electrostatic cleaning may assist in cleaning even microscale impurities such as dust.

The substrate is preferably light transmissive, so that when the opaque coating is etched away, the remaining pattern on the decorative surface may allow light to be transmitted therethrough. The transmissive substrate may also have a tint applied, such that coloured light is observable from the pattern etched in the coating.

The substrate may comprise an electrically insulating material, preferably a polymer such as polycarbonate. The method may comprise the further step of moulding the polymer to form the substrate, optionally through a moulding method such as injection moulding.

The decorative surface may be formed directly on a decorative article; preferably wherein the decorative article is a three-dimensional object.

In a further aspect, there is provided a decorative article (optionally including a decorative surface) formed by a method as described herein. In a further aspect, there is provided a decorative article comprising a substrate and an opaque coating, applied to the substrate via a vapour deposition process; wherein the coating exposes, preferably by etching, the substrate selectively, thereby preferably to form a decorative pattern.

The decorative article may preferably be suitable for handling by a user, and/or suitable for use as at least part of a housing for a kitchen appliance. The decorative article may be a component of a kitchen appliance.

The coating of the decorative article may comprise a pattern that allows light to be transmitted therethrough, the pattern preferably being formed by the selective etching of the coating. The decorative article may comprise at least one edge, wherein the pattern is located away from said at least one edge (i.e. the pattern is in the middle of the decorative article).

The decorative article may be capable of being illuminated by a light source. Preferably the decorative article further comprises a light source arranged such that light from the light source is visible via the pattern. More preferably the light source is enclosed within the decorative article such that light from the light source is visible only via the pattern. The light source may also be configurable to convey information related to the condition of the kitchen appliance, optionally wherein the light source is controlled by a processor.

The pattern may be provided on a part of the decorative article which is configured to face towards a user in normal use, preferably wherein the decorative surface is a circular face of the decorative article, more preferably wherein the pattern is generally annular. The decorative article may be a control knob, preferably comprising a protective collar.

The coating of the decorative article may be metallic, preferably wherein the coating comprises aluminium; more preferably wherein the coating is an elemental coating. The coating may have a thickness of at most 0.5 µm, preferably wherein the thickness of the coating is between 0.3 µm and 0.5 µm. The coating may be reflective, preferably wherein the coating has a reflectance of at least 80%, more preferably at least 90%, for light at a wavelength within the range 300 to 700 nm; yet more preferably wherein the coating is mirror-like. The coating may have at least one of the following properties: a Vickers hardness of 600 MPa or less, preferably between 160 and 350 MPa; and a density of 2.7 $g/cm^3$ or less.

The coating may be etched via a laser. The laser may have at least one of the following properties: a power output at peak of at least 50 watts, preferably at least 75 watts; being capable of emitting light having a wavelength for which the substrate is substantially transparent; preferably wherein the wavelength is 10 µm or lower, more preferably wherein the wavelength is approximately 1.06 µm; and being a CO2 laser.

The vapour deposition process may be a physical vapour deposition process. The decorative article may consists of food safe materials, preferably wherein said materials are physically and chemically stable at least at temperatures between 0 degrees and 100 degrees Celsius.

The decorative article may further comprise at least one of: a lacquer which is applied to the coating prior to etching; a protective coating which is applied to the decorative surface following etching, preferably wherein the protective coating is UV-resistant; and a base coating which is applied to the substrate prior to coating with an opaque coating. Optionally the substrate is cleaned, preferably ultrasonically, prior to applying a base layer; and optionally the base coating is cleaned, preferably electrostatically, prior to coating with an opaque coating.

The substrate may be a light transmissive substrate, which is optionally tinted. The substrate may comprise an electrically insulating material, preferably a polymer material such as a polycarbonate polymer. A polymer may be moulded (optionally by injection moulding) to form the substrate.

In a further aspect of the invention, there is provided a kitchen appliance comprising a decorative article as described herein, preferably wherein the kitchen appliance further comprises a housing; more preferably wherein the opaque coating of the decorative article and at least an outer part of the housing of the kitchen appliance are formed of materials which are substantially similar in appearance; preferably wherein said materials are the same.

The use of a vapour deposition process may be particularly advantageous as it allows for a relatively thin coating layer to be deposited. Other possible deposition processes may involve metalising (for example using Chromium) a non-conductive substrate (e.g. formed of a transparent plastic such as a polycarbonate, or possibly glass) before a finish is applied via a deposition process. In such other deposition processes, the thickness of the metallised layer may be typically multiple micrometres (for example, for a thickness of 0.1 to 0.3 µm of the coating layer, a metallised layer of 6-9 µm of copper and 3-6 µm of nickel underneath may be needed, giving a total thickness of ~9-15 µm). The excessive thickness of the finish produced by such other deposition processes may render laser etching dangerous, as prolonged, high-power lasing may be needed to etch the finish, causing a risk of reflected laser light damaging machinery and harming workers in the area of the laser.

Additionally, materials used in such other deposition processes may be generally relatively hard substances, which may increase the need for high-energy, long-period lasing in order to etch the materials. Finally, as the thermal properties of the material being lased may be important in determining the length and energy needed for laser-etching, materials used in such other deposition processes may be undesirable as they have generally high melting points, boiling points, and heats of vaporisation, meaning long-duration/high-energy lasing is needed for etching. Reflection of light may be a particularly acute problem in the lasing of optically shiny coatings, as these are naturally the most reflective in the visible spectrum and do not scatter the light they reflect by as much as non-shiny coatings.

A mask may be used to cover the area of the substrate which is intended to remain transparent, over which a shiny coating may be applied. However, this may yield possibly substandard results, with chipping/flaking of the coating potentially occurring at the edges of the mask when the mask is removed from the substrate.

The invention described herein may be used in any kitchen appliance and/or as a stand-alone device. This includes any domestic food-processing and/or preparation machine, including both top-driven machines (e.g., stand-mixers) and bottom-driven machines (e.g., food processors). It may be implemented in heated and/or cooled machines. The invention may also be implemented in both hand-held (e.g., hand blenders) and table-top (e.g., blenders) machines. It may be used in a machine that is built-in to a work-top or work surface, or in a stand-alone device. The invention can also be provided as a stand-alone device, whether motor-driven or manually powered.

Whilst the invention has been described in the field of domestic food processing and preparation machines, it can also be implemented in any field of use where efficient, effective and convenient preparation and/or processing of material is desired, either on an industrial scale and/or in small amounts. The field of use includes the preparation and/or processing of: chemicals; pharmaceuticals; paints; building materials; clothing materials; agricultural and/or veterinary feeds and/or treatments, including fertilisers, grain and other agricultural and/or veterinary products; oils; fuels; dyes; cosmetics; plastics; tars; finishes; waxes; varnishes; beverages; medical and/or biological research materials; solders; alloys; effluent; and/or other substances. Any reference to "food", "beverage" (or similar language) herein may be replaced by such working mediums.

As used herein, the term "processing" preferably connotes any action relating to or contributing towards transforming products into foodstuff, or transforming foodstuff into a different form of foodstuff, including—as examples—applying mechanical work (e.g. for cutting, beating, blending, whisking, dicing, spiralising, grinding, extruding, shaping, kneading etc.) and applying heat or cold. "Food" and "foodstuff" as used herein can include beverages and frozen material and material used in creating them (e.g., coffee beans).

As used herein, the term "decorative" should preferably be understood to refer to an article which is more than merely functional (i.e. the article is designed based on at least some aesthetic consideration); preferably wherein the article is reflective or shiny; more preferably wherein the article includes a reflective or shiny portion and a light transmissive portion or pattern.

As used herein, the term "vapour deposition" preferably connotes a manufacturing process in which vapourised material is deposited on a surface; preferably wherein said vapourised material is transported via a vacuum environment to the surface; preferably also wherein the process does not involve the direct application of an electrical current to the surface. As used herein the term "vapour deposition" should be understood to be encompass the meaning of the term "vacuum deposition" (i.e. the term "vacuum deposition" should be understood as referring to a form of "vapour deposition" which uses a vacuum).

As used herein, the term "light transmissive" includes either "transparent" or "translucent". It will be appreciated that any component referred to herein as being "transparent" may also be "translucent", and vice versa.

As used herein the term 'shiny' is preferably interchangeable with the term 'reflective'.

As used herein the term "control knob" preferably connotes a generally cylindrical element which protrudes from a device, being rotatable or otherwise actuable by a user to adjust or control the device. The knob may also be referred to as a button, controller, switch, or dial.

As used herein, the term "etching" preferably connotes removing a surface layer of material on an article, for example by dissolving the layer; more preferably such that at least a portion of a layer of material is removed (where the layer consists of a single material).

As used herein in relation to an object, the term "opaque" preferably connotes an object that is sufficiently opaque such that it cannot be seen through with the naked eye; more preferably an object that is sufficiently opaque such that a light behind the object cannot be seen shining through the object with the naked eye.

As used herein in relation to an object, the term "transparent" preferably connotes an object that is sufficiently transparent such that it can be seen through with the naked eye; more preferably an object that is sufficiently transparent such that a light behind the object can be seen shining through the object with the naked eye.

As used herein in relation to an object, the term "translucent" preferably connotes an object that is sufficiently translucent such that it can be seen through, at least partially, with the naked eye; more preferably an object that is sufficiently translucent such that a light behind the object can be seen shining through the object, at least partially, with the naked eye.

As used herein, the term "surface" preferably connotes at least part of a wall of an article, optionally wherein said wall is part of a housing of a device such as a kitchen appliance, more preferably wherein the surface is generally planar.

As used herein, the term "decorative article" preferably connotes an article including a decorative surface, preferably a three-dimensional article, more preferably an article that is formed of or includes more than a single (separate) surface. The terms "decorative article" and "decorative surface" may also be used synonymously.

Any apparatus feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

The invention extends to methods, system and apparatus substantially as herein described and/or as illustrated with reference to the accompanying figures.

BRIEF DESCRIPTION OF THE FIGURES

One or more aspects will now be described, by way of example only and with reference to the accompanying drawings having like-reference numerals, in which:

FIG. 3a is a schematic drawing in plan showing a knob according to an embodiment of the invention;

FIG. 3b is a schematic, side-on drawing of the knob of FIG. 3a;

FIG. 3c is a schematic, perspective drawing of the knob of FIG. 3a; and, FIG. 4 is a schematic, frontal view of a food processing appliance including the knob of FIG. 3a.

DETAILED DESCRIPTION OF THE FIGURES

Figure 1:
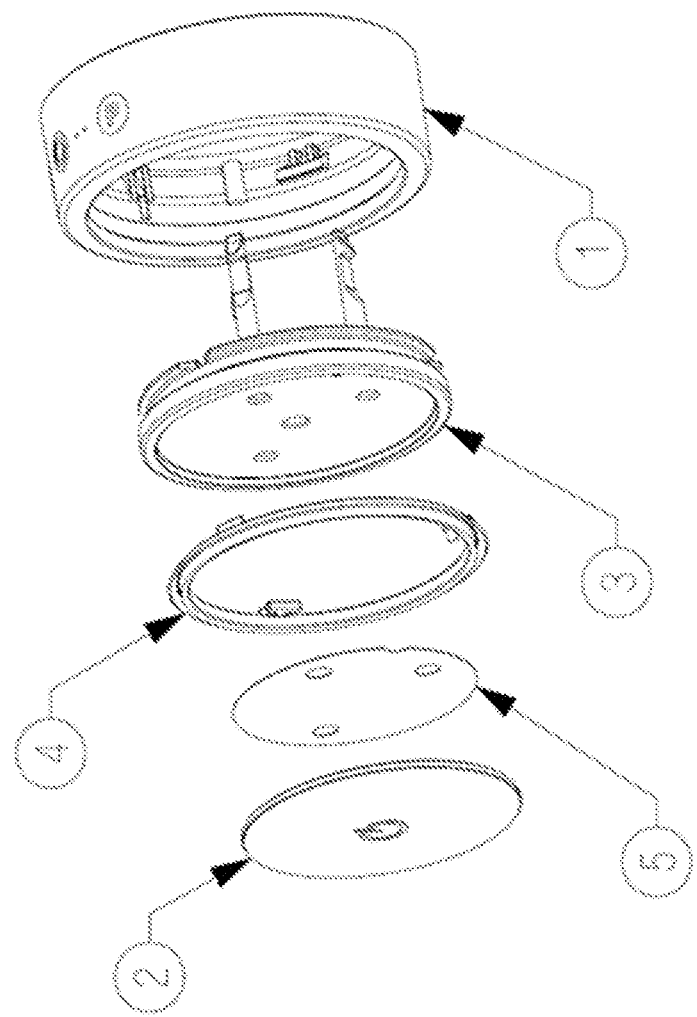
FIG. 1 is an exploded perspective view of a prior-art knob.
Figure 2:
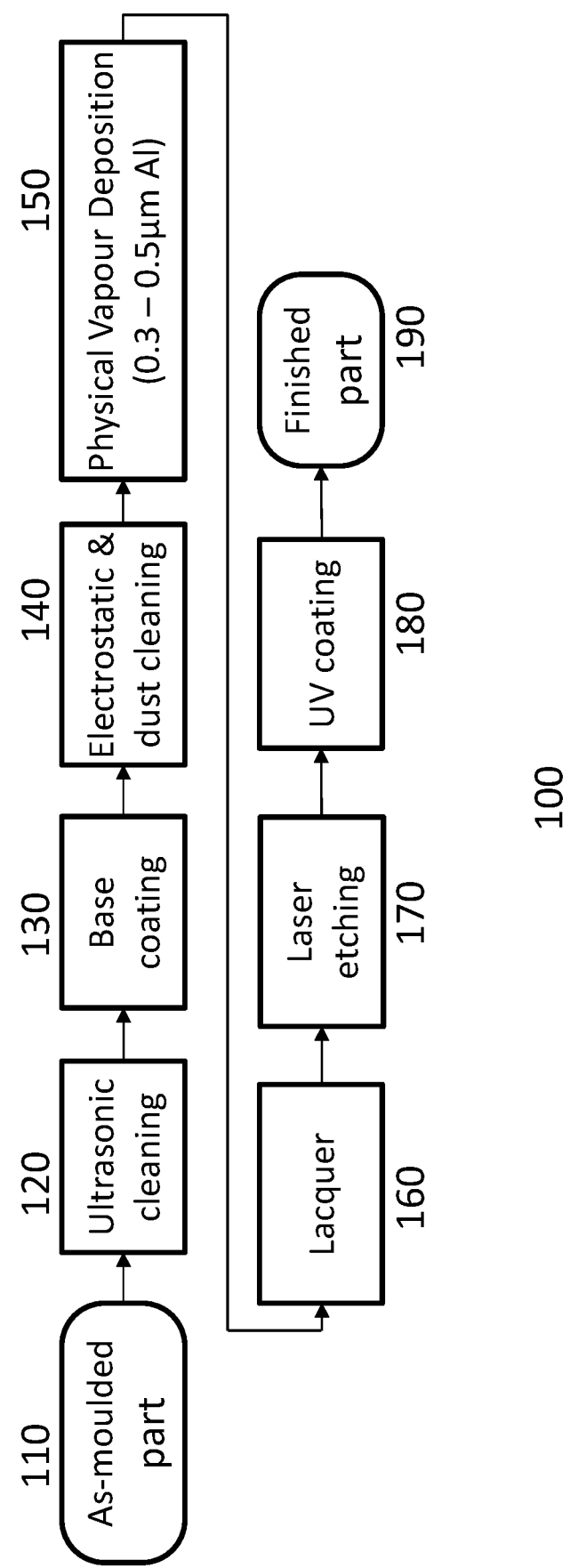
FIG. 2 is a flow-chart showing a method of manufacture according to an embodiment of the invention.

A flow chart of a method of manufacture for a single-piece control knob including a decorative surface, generally labelled 100, is shown in FIG. 2. The method includes coating a substrate via a vapour deposition process, and etching the coating to expose the substrate selectively.

In more detail, a substrate is firstly obtained using a transparent or translucent material in a moulding step 110. The moulding step 110 may be, for example, an injection moulding step. The substrate is then ultrasonically cleaned in an ultrasonic cleaning step 120 to remove dirt. A base coat 130 is then applied to enhance the adhesion of further coatings.

This transparent material used in step 110 may be a plastic material such as polycarbonate, which is desirable as it easy to mould and food-safe. Alternatively the material may be a material such as glass or another relatively transparent, light-transmissive material compared to the coating, and step 110 may comprise another way of obtaining the substrate other than moulding (e.g., casting, forming, machining, or carving).

An optional further cleaning step is then performed at step 140, comprising performing electrostatic cleaning to remove microscale impurities such as dust.

The substrate is then plated (i.e. coated) on the outer surface using a PVD (Physical Vapour Deposition) process 150 in order to apply a thin film metallic coating. As the substrate is non-conductive, this process may be referred to as a non-conductive vacuum metallisation (NCVM) step. To protect the coating applied in the PVD process 150, a mid-stage lacquer is applied at step 160.

The PVD process 150 may be advantageous as the resulting shiny finish layer can be very thin compared to that achieved through electro-deposition on a non-conductive substrate, as there is no need to apply a conductive layer first. PVD 150 also results in a thinner, more even and consistent coating than that achievable through e.g., spraying or painting. Other forms of vapour deposition may be used, such as, for example, chemical vapour deposition (CVD); however PVD is preferred as it avoids the need for e.g., chemical reactions to occur in the forming of the coating, meaning that an elemental (i.e., single element) coating can be achieved. Elemental coatings are desirable as they are typically more chemically stable. Lower substrate temperatures can also be advantageously used in PVD processes compared to those required for CVD processes.

As the coating achieved using the PVD process 150 is relatively thin (less than 1 µm, and preferably less than 0.5 µm, and more preferably still 0.3-5 µm) it can be etched safely by a laser. An aluminium coating may be used as the coating in this step, as it ensures that a shiny finish is achieved, and further enables lasing as it is a much softer substance compared to conventional coatings. The coating preferably has a hardness of less than around ~600 MPa Vickers, and more preferably still in the range 160-350 MPa Vickers. Aluminium is also much less dense than conventional coatings, making it easier to lase. Aluminium also has a lower melting, boiling point and heat of vaporisation than conventional coatings using a coating substance having such thermal characteristics may therefore be advantageous.

To ensure that the coating used in the PVD process 150 is sufficiently shiny, the coating material should have a reflectance of 80% or more, and more preferably 90% or more, of light in the visible spectrum (e.g., at a wavelength in the range 300-700 nm). More preferably, at least 80% of light at all wavelengths across the visible spectrum is reflected. Aluminium is an example of a suitable material which has this property. To ensure a mirror-like finish at least the majority of reflection should be so-called specular reflection (i.e., "mirror-like" reflection along an appropriate reflected angle rather than diffusion at many different angles).

Whilst aluminium coating is used here in the PVD process 150, another coating of a similar maximum thickness and/or hardness and/or density, such that it may be easily lased, may also be used. Whilst a shiny coating is desirable, another visible-light-opaque coating may be used depending on the circumstances, though shiny coatings are particularly desirable in kitchen appliances due to the ease with which dirt may be detected on them.

Coating on an outer surface of the transparent substrate (i.e., where the substrate is a concave element like the knob of FIG. 3b, on the surface opposite to the direction in which the substrate curves) is desirable as this surface faces the user during use. However, the coating may in an alternative be applied on an inner surface (i.e., for a concave element such as a curved front surface of a knob, the surface towards which the element curves). Coating on the inner surface, however, is less desirable as the user will only see the shiny finish through the transparent substrate, which reduces the effect of making dirt easily identifiable. Alternatively the whole surface of the substrate may be coated, in which case the coating will need to be etched on more than one side to allow light to shine through it.

To produce a light transmissive portion on the decorative surface for light to shine through (i.e. the clear annular 'halo' on a control knob), the plated finish is selectively etched away by laser in the area to be illuminated (i.e. the light transmissive portion) in a lasing step 170. The laser used in this lasing step 170 is preferably a laser of sufficient power to, at peak, evaporate the coating used, with the beam strength and duration selected so as not to damage the underlying substrate. For example, for etching an aluminium coating a $CO_2$ laser may be used having a peak emission power of more than approximately 50 watts, and more preferably more than approximately 75 watts. The wavelength of the laser should preferably be lower than around 10 µm, for example it may be 1.06 µm, a wavelength particularly suitable for etching metals as it is more readily absorbed by them.

Using a visible-light laser, or at least a laser for which the substrate is substantially transparent, helps prevent absorption of the laser light by the substrate thus preventing damage during etching. For example, polymers such as polycarbonate are substantially transmissive of light at a wavelength of 1.06 µm.

While lasing provides a particularly advantageous etching method due to it being non-contact, cheap, easily automated and not involving environmentally-harmful substances, it will be appreciated that other etching methods, for example physical scraping or chemical etching, could instead be used in an alternative.

Finally, the outer surface of the substrate is UV coated in a UV coating step 180 to add durability to the finish and reduce any transition between the plated and the etched areas. The UV coating 180 protects the substrate and coating from being degraded by UV light and also forms a final protective lacquer helping to prevent e.g., scratching.

The base coating 130, lacquer 160, and/or UV coating 180 are preferably transparent to visible light including laser light (or at least do not substantially absorb the laser light). As food processing in cooking appliances, particularly those incorporating heating elements, involves heated substances, the coatings and substrate used in the process 100 should preferably be physically stable (i.e. not melt or readily deform) within at least the range 0-100 degrees Celsius. They should also preferably be chemically stable within the 0-100 degrees range, and not react with each other or decompose chemically within this temperature range. Materials used should preferably also be food safe and, for example, not include BPA or other potentially toxic materials.

The process 100 may generally be implemented in a factory setting, where the substrate is processed on a conveyor line moving past a plurality of stations. All or some of the described steps may be automated—for example, automatic injection moulding of the substrate may take place before the substrate is placed on a conveyor line, the physical vapour deposition 150 may take place automatically via a specially configured chamber, and the laser etching step 170 may be performed by a suitably programmed lasing device, such as a robot arm including a laser. The other cleaning and coating steps may be performed by suitably configured robot arms (or other such devices).

FIGS. 3a-3c show an exemplary decorative article in the form of a knob 200 including a decorative surface achieved through the process 100.

The knob 200 comprises a coated portion 210, which is opaque, and an etched portion 220 in which the transparent substrate is exposed and from which light may be transmitted. The knob thereby includes a pattern which light may be transmitted therethrough. The etched portion 220 may be ring-shaped or another suitable shape, though a ring-shape is particularly suitable for a circular knob where the whole circumference may be used by the user.

The light within the knob 200 is provided by an LED or similar light source powered from the appliance on which it is used. Where desired, the transparent substrate of the knob 200 may be tinted such that light is emitted from the knob having a different colour to the light source. For example, the substrate of the knob 200 may be tinted red in places to indicate a particular option (e.g., "Pulse setting" where a rotary tool 320 of the appliance 300 is only activated to rotate for a short duration) is selected by turning the knob to the part of the circumference of the knob tinted red. This tinting may be provided by a coating or may be integral to the substrate.

The knob 200 is preferably mounted on a spring-loaded carriage so that, when it is depressed against the bias of the spring, or otherwise moved axially, a micro-switch or other relay is triggered sending a signal to a central processing unit of the appliance 300 to which it is attached that to issue instructions to it. The instructions may be dependent on the orientation of the knob. Alternatively the knob 200 may be fixed axially and instead only control the appliance with which it is used by rotating e.g., via a potentiometer.

A collar 230 may be provided, also coated with the same coating as the coated portion 210, to protect the spring-loaded carriage and other internal elements of the knob 200 when the knob 200 is not depressed. The collar 230 may be fixed to the knob 200 to ensure a single-piece construction, or it may be provided separately on the appliance 300.

Figure 4:
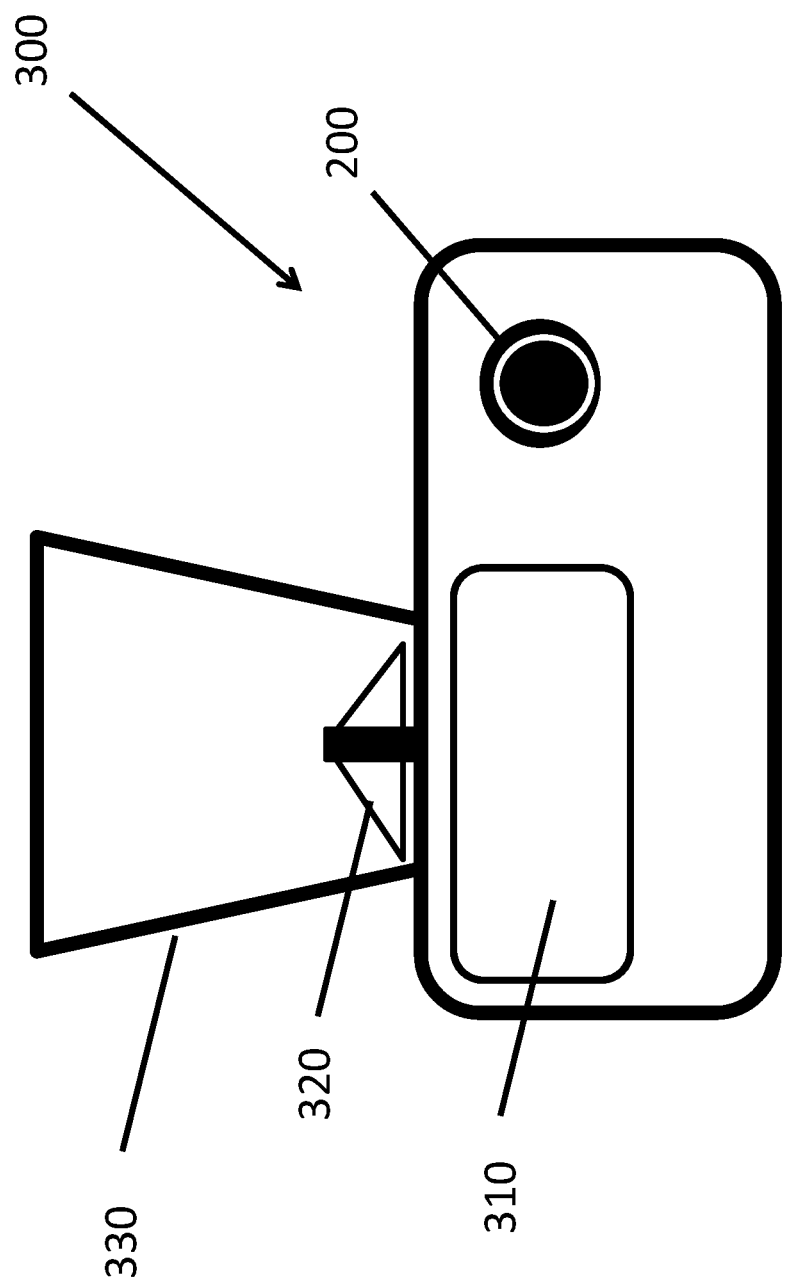

FIG. 4 shows a kitchen appliance (or a food processing appliance) 300 incorporating the knob 200. The kitchen appliance 300 comprises a user interface 310, a rotary tool 320, and a container 330 which is attached to the appliance 300 and in which the rotary tool 320 rotates to process food. Options may be selected using the knob 200 on a user interface 310 of the appliance 300 either by simply turning the knob 200 to the corresponding setting, or by turning the knob 200 to the corresponding setting and depressing it to select the appropriate option.

Depending on the option selected, the appliance 300 can respond to the option selected using the knob 200 by causing the rotary tool 320 to rotate within the container 330 to process food or beverages within, and/or cause heating and/or cooling elements to carry out heating and/or cooling of the contents of the container 330. Feedback regarding options and processing can then displayed to the user via the user interface 310.

The coated surface of the knob is generally the same (at least in appearance) as the housing of the main body of the kitchen appliance, such that the knob blends in with the rest of the housing of the kitchen appliance.

Optionally, the light source may be configured such that it shines through only part of the annular light-transmissive pattern, which allows different tinted parts of the pattern to be lit up as the knob is rotated (e.g. to indicate the selection of different options).

Whilst the invention has been discussed in terms of manufacturing a control knob for a kitchen appliance, it could be used for producing any kind of article including a decorative surface as described, or for producing a suitable etched coating on any suitable substrate, and is not limited to creating a knob.

It should be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A method of manufacturing a decorative surface, comprising:
    coating a light transmissive substrate with an opaque non-light transmissive metallic coating using a vapour deposition process;
    thereafter, applying a lacquer layer to the coating;
    thereafter, etching the coating together with the lacquer layer to selectively remove portions of both layers so as to expose portions of the substrate thereby to manufacture a decorative surface; and
    wherein the decorative surface comprises a pattern that allows light to be transmitted through the exposed selected portions of the substrate.

2. The method according to claim 1, wherein the coating is an elemental coating.

3. The method according to claim 1, wherein the coating has a thickness of at most 0.5 µm.

4. The method according to claim 1, wherein the coating has a reflectance of at least 80%.

5. The method according to claim 1, wherein the coating has a Vickers hardness of 600 MPa or less, and a density of 2.7 g/cm$^3$ or less.

6. The method according to claim 1, wherein etching comprises using a laser having a power output at peak of at least 50 watts being capable of emitting light having a wavelength for which the substrate is substantially transparent.

7. The method according to claim 1, wherein the vapour deposition process is a physical vapour deposition process.

8. The method according to claim 1, wherein the decorative surface consists of food safe materials, wherein said materials are physically and chemically stable at least at temperatures between 0 degrees and 100 degrees Celsius.

9. The method according to claim 1, further comprising applying a protective coating to the decorative surface following etching.

10. The method according to claim 1, further comprising the step(s) of applying a base coating to the substrate prior to coating with an opaque coating; optionally cleaning the substrate prior to applying a base layer; and optionally cleaning the base coating prior to coating with an opaque coating.

11. The method according to claim 1, wherein the method further comprises the step of applying a tint to at least part of the light transmissive substrate.

12. The method according to claim 1, wherein the substrate comprises an electrically insulating material, and wherein the method further comprises moulding a polymer to form the substrate.

13. The method according to claim 1, wherein the decorative surface is formed directly on a decorative article and wherein the decorative article is a three-dimensional object.

* * * * *